United States Patent
Franco et al.

(10) Patent No.: US 8,325,352 B2
(45) Date of Patent: Dec. 4, 2012

(54) SYSTEM AND METHOD FOR PRODUCING A WINDOW SHADE WITH A NATURAL MATERIAL PRINTED IMAGE COATING

(76) Inventors: Carmine Franco, Laval (CA); Sandro Franco, Laval (CA)

( * ) Notice: Subject to any disclaimer, the term of this patent is extended or adjusted under 35 U.S.C. 154(b) by 915 days.

(21) Appl. No.: 12/417,733

(22) Filed: Apr. 3, 2009

(65) Prior Publication Data

US 2009/0251714 A1    Oct. 8, 2009

(30) Foreign Application Priority Data

Apr. 7, 2008 (CA) .................................... 2628601

(51) Int. Cl.
*G06F 3/12* (2006.01)

(52) U.S. Cl. ............. 358/1.1; 101/494; 347/1; 347/110; 160/107; 160/113; 160/130; 160/223

(58) Field of Classification Search ......................... None
See application file for complete search history.

(56) References Cited

U.S. PATENT DOCUMENTS

| | | | |
|---|---|---|---|
| 5,203,941 A | * | 4/1993 | Spain et al. .................... 156/209 |
| 5,443,563 A | | 8/1995 | Hindel et al. |
| 7,034,248 B2 | | 4/2006 | Crouse, Jr. et al. |
| 7,207,270 B2 | | 4/2007 | McCarty et al. |
| 2002/0024479 A1 | * | 2/2002 | Palmer et al. .................... 345/30 |
| 2007/0221084 A1 | | 9/2007 | McCarty et al. |
| 2007/0221344 A1 | * | 9/2007 | Beach et al. .................. 160/236 |

* cited by examiner

*Primary Examiner* — Marivelisse Santiago Cordero
*Assistant Examiner* — John Wallace
(74) *Attorney, Agent, or Firm* — Norton Rose Canada LLP

(57) ABSTRACT

A method and a system for producing a window shade having a real natural material printed image coated thereon. A real natural material is scanned and the data of the image is stored in a computer which generates an image of the scanned real natural material. That image is duplicated a plurality of times by the use of the computer and the images are assembled in a predetermined arrangement to produce a composite image which is then enhanced using photo-enhancing software. The enhanced composite image is then printed by the use of a colored ink printing machine on material to form the window shade. Preferably, but not exclusively, the material is constituted by slats of a louvered blind or a fabric of a roller blind.

14 Claims, 4 Drawing Sheets

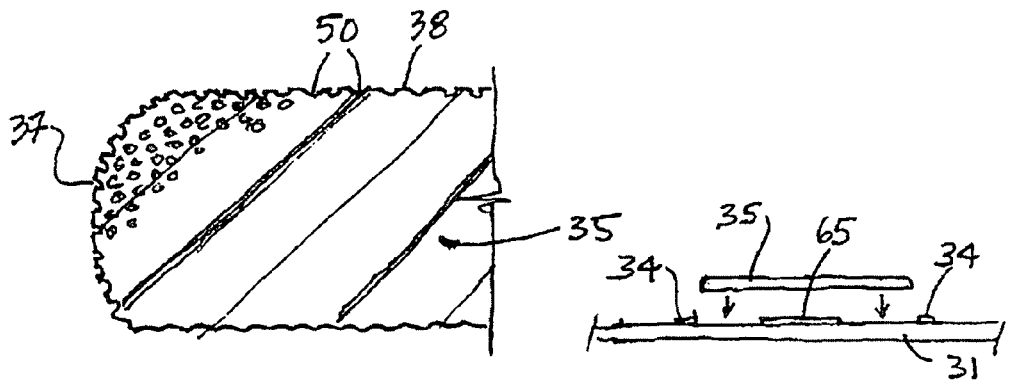
FIG. 7
FIG. 10
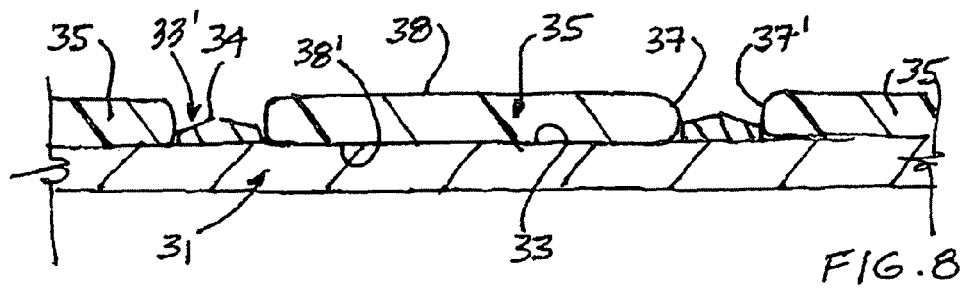
FIG. 8
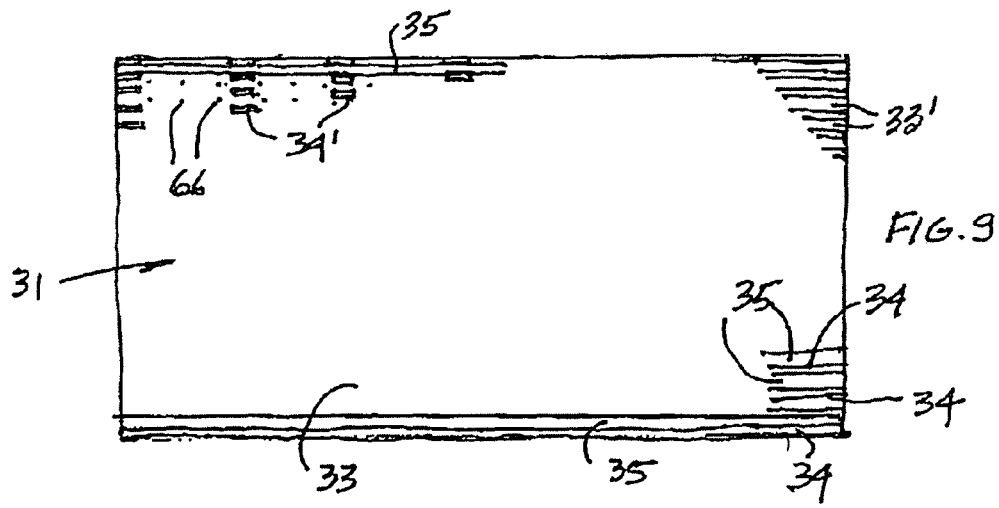
FIG. 9

SYSTEM AND METHOD FOR PRODUCING A WINDOW SHADE WITH A NATURAL MATERIAL PRINTED IMAGE COATING

TECHNICAL FIELD

The present invention relates to a method and system for reproducing a natural material printed image coating on at least one of opposed surfaces of a window shade by the use of a scanner, a computer, photo-enhancing software and a colored ink printing machine.

BACKGROUND ART

It is known to print images on window shades or on the slats of louvered blinds. Reference is made to U.S. Pat. Nos. 5,443,563; 7,034,248 and 7,207,270 as examples of these. Those patents are concerned with printing pictorial images or decorative graphics on the shades or the slats of louvered blinds.

There are several disadvantages in printing on synthetic fabrics or slats of louvered blinds, one being the difficulty in providing a printed surface to which the paint or ink will adhere. Often by manipulating the shades and cleaning same the printed image will wear-off in certain areas or peel off when exposed to sunlight and hot temperatures as are common in windows and glass doors. When printing on slats of louvered blinds one major problem is to ensure that the side edges of the slats are also printed whereby the edges will blend in with the image and not form demarcation lines. When the side edges are not printed on and the blind is slightly in an open position streaks of different colors will appear across the image and produce a non-pleasing effect destroying the aesthetic thereof.

Another disadvantage of the prior art is that it is difficult to produce large images on these products without distortion or imperfections.

It is also desirable to produce roller blinds and louvered blinds which resemble real wood or weaved natural materials, such as bamboo strips or all sorts of long grasses. To simulate this printed material, strips are glued or otherwise attached onto the slats of louvered blinds. For fabric blinds, these patterns are usually printed on by printer rolls. Because the fabric is pliable distortion often occurs in the image and a repeat pattern is produced on the fabric piece due to the use of rolls. These repeat patterns are visible to the eye and accordingly the end product does not produce the natural material effect.

It is also known to extrude slats for louvered blinds from a colored plastic material which resembles real wood. Often these slats are also fed through press rolls which produce a grain effect on the surface of the material before it hardens. Again, this woodgrain effect has a repeat pattern and the color of the plastic material is substantially uniform throughout the length of the slat.

SUMMARY OF INVENTION

It is a feature of the present invention to provide a method and a system for producing window shades having a natural material printed image coated on at least one of opposed surfaces thereof.

Another feature of the present invention is to provide a window shade having a natural material printed image coated on at least one of opposed surfaces thereof, simulating the real natural material.

Another feature of the present invention is to provide a method and a system which utilizes a scanner, a computer and a colored ink printer device and wherein large images representative of a real natural material are structured with the use of the computer and enhance with the use of photo-enhancing software and then printed on the material to form a window shade simulating the real natural material.

Another feature of the present invention is to provide a method and a system for producing a window shade with a natural material printed image coated thereon and wherein the image is substantially free of any defects or visible repeat patterns.

Another feature of the present invention is to provide a method and a system capable of producing a composite software enhanced image of a natural material and wherein the image is produced by duplicating one or more computer generated images produced by scanning one or more portions of a real natural material and wherein these computer-generated images are duplicated and grouped together and enhanced by photo enhancing software whereby a large surface area of a fabric or a plurality of louvered blind slats can have the image printed thereon and when assembled in a window shade resembles a real natural material in texture and color.

According to a broad aspect of the present invention there is provided a method of producing a window shade with a natural material printed image coating on at least one of opposed surfaces thereof. The method comprises the steps of scanning on a scanner device a sample of a real natural material. The method also comprises reproducing, by the use of a computer, a computer-generated image of the scanned sample on a screen of a computer. A plurality of the computer-generated image are duplicated. The plurality of computer-generated images are assembled together in a predetermined arrangement. These images are then enhanced to blend the images into a composite software enhanced image resembling a large piece of the natural material. The composite software enhanced image is then printed by the use of a colored ink printing machine on material to form the window shade.

According to a further broad aspect of the present invention there is provided a system for the production of a window shade having a natural material image coated on at least one of opposed surfaces of the window shade. The system comprises a scanner adapted to scan a surface of a sample of a real natural material. The system also comprises a computer having a memory for storing data representative of an image of the scanned surface. A computer screen displays a computer-generated image of the scanned surface and by user interface an assembly of a plurality of the computer-generated images are assembled in end-to-end and side-by-side relationship on the screen. Photo-enhancing software treats the assembled images to reproduce a composite software enhanced image resembling a large piece of the scanned natural material. A colored ink printer device is provided for printing the composite software enhanced image on material to form the window shade.

According to a still further broad aspect of the present invention there is provided a window shade having a natural material printed image coated on at least one of opposed surfaces thereof. The printed image is formed by one or more computer-generated images produced by scanning a sample of a real natural material and assembling the images together in a predetermined arrangement and treated by photo-enhancing software to produce a composite enhanced image resembling a large piece of the natural material for printing on the window shade.

BRIEF DESCRIPTION OF DRAWINGS

A preferred embodiment of the present invention will now be described with reference to the accompanying drawings in which:

FIG. 7 is a transverse section view of a portion of a slat produced to exhibit micro pores to receive and retain printer ink on the surfaces thereof;

FIG. 8 is a fragmented section view showing the construction of the rigid flat support carrier sheet associated with the printer machine and adapted to support a plurality of slats in a spaced-apart relationship;

FIG. 9 is a plan view of the support carrier sheet showing two examples of the construction of the spacer elements and the position of the slats thereon;

FIG. 10 is a fragmented end view illustrating one example of how the slats are retained in the slat retention space between the spacer elements;

DESCRIPTION OF PREFERRED EMBODIMENTS

Figure 1:
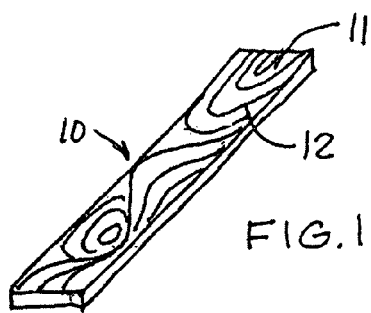
FIG. 1 is a perspective view of a sample woodpiece having a surface exhibiting a woodgrain pattern and a wood color or essence.

Referring now to the drawings and more particularly to FIGS. 1 to 5, there is shown the method and system for producing a composite software enhanced image representative of a natural material to be printed on a window shade. The natural material is herein illustrated by a flat woodpiece 10 having a wood essence stained on an upper surface 11 thereof for use in forming the composite image, as will be described below. The woodpiece 10 also has a grain 12 displayed on the flat top surface 11. It is pointed out that the woodpiece may also not be stained and have a natural color, such as ebony, mahogany, etc.

Figure 2:
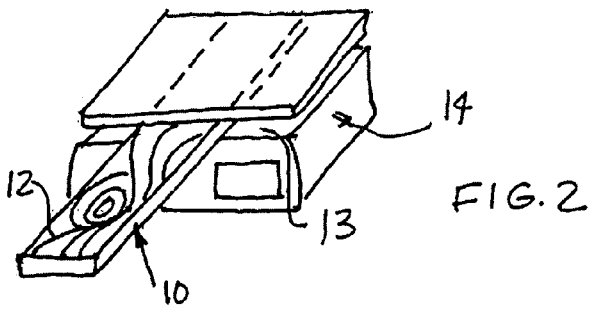
FIG. 2 is a perspective view showing the sample woodpiece positioned in a scanner device.
Figure 3:
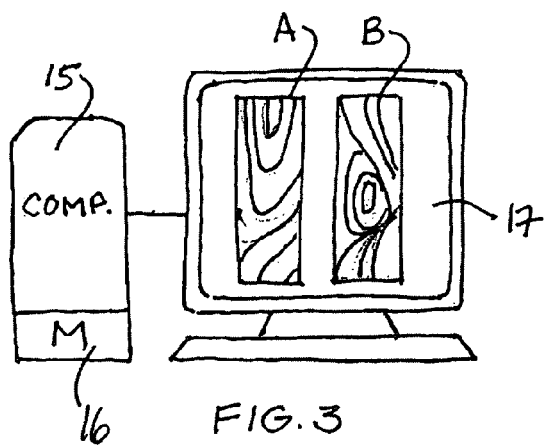
FIG. 3 is a simplified front view of a computer and a computer screen and wherein two scanned images of the sample board of FIG. 1 are displayed on the screen.

As shown in FIG. 2, a flat surface of the woodpiece 10 is placed on a clear surface 13 of a scanner device 14 and scanned. The scanner 14 is connected to a computer 15, as shown in FIG. 3, which stores in its memory 16 data representative of the scanned image. The scanned image is identified by the letter "A" on the screen 17 associated with the computer 15. If more than one image is required to form the composite software enhanced image, then the sample woodpiece 10 is repositioned on the clear surface 13 of the scanner whereby another portion of the woodpiece is scanned. This other portion of the woodpiece is represented by image "B" on the screen 17.

Figure 4:
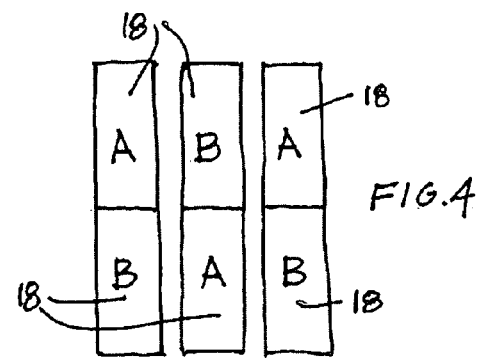
FIG. 4 is a plan view showing an arrangement of the two computer-generated images which have been duplicated and positioned side-by-side and end-to-end prior to assembly together.
Figure 5:
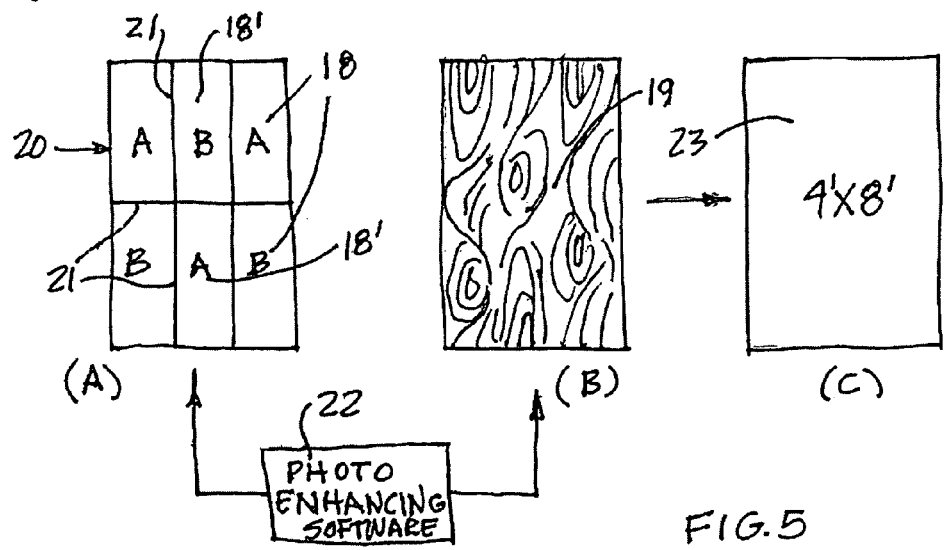
FIG. 5 is a schematic plan view showing the images of FIG. 4 being disposed in side-by-side and end-to-end contact relationship and disposed in a predetermined arrangement and with each of the images being delineated by straight parallel lines and wherein photo-enhancing software is used to produce an enhanced image resembling a large piece of the natural material and wherein the images are reproduced several times whereby to print an image of about 4'×8' for printing on material to form the window shade.
Figure 13:
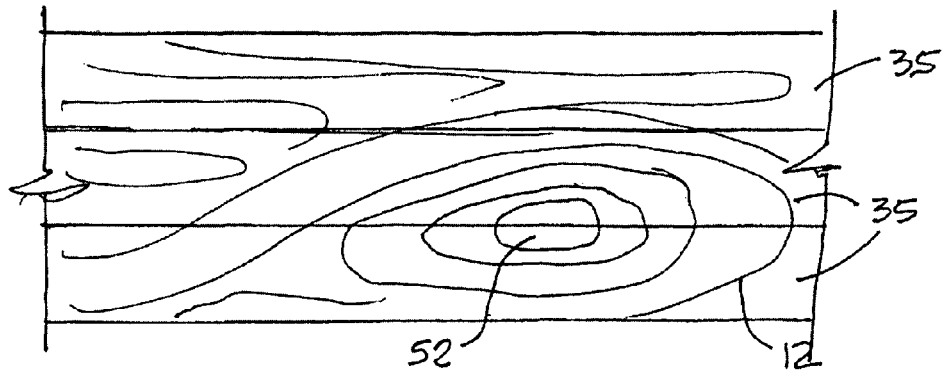
FIG. 13 is a side view showing an image produced in accordance with the present invention coated on the surface of adjoining slats whereby a pattern or texture appears over adjacent ones of the slats to substantially resemble a natural material.

By the use of the computer 15 the images "A" and "B" are reproduced several times. For purpose of illustration, FIG. 4 shows only six of these computer-generated images 18 for assembly, but in fact many of these images would be assembled together to produce a composite software enhanced image 19 as shown in FIG. 5. As shown in FIG. 5, illustration "A", the computer-generated images 18 are brought together in side-by-side and end-to-end relationship to form an assembled image 20 with each image 18 oriented in a predetermined manner. Each of the images 18 are delineated by straight lines 21 and form an assembled image 20.

This assembled image 20 is then enhanced using photo-enhancing software 22 stored in the computer, such as Photoshop (registered trade mark), whereby to eliminate the delineated straight lines 21. The images may also be overlapped at their side edges or end edges to produce an image wherein the grain effect looks natural throughout and the delineated straight lines 21 are eliminated. These images can also be offset from one another and then the total assembled image cropped in its periphery to form a rectangle or square enhanced image 19. Also as shown in the "A" representation of FIG. 5, the computer-generated images can be inverted when disposed side-by-side, such as the inverted images 18' whereby to further break the repeat pattern of the woodgrain and thus a computer software enhanced image 19 as shown in FIG. 5(B) is generated and stored in memory. It is pointed out that this computer-generated image 19 may be formatted to be reproduced of a size of approximately 4'×8', as shown in the representation 23 in FIG. 5(C), whereby an image of this dimension is available for printing.

Although the sample piece of the natural material is hereinshown as being a woodboard, it could easily be a piece of fabric to be reproduced such as the fabric image illustrated in FIG. 15 and which will be described later. The image 19 simulates a real product "look" to be reproduced on a shade.

Figure 6:
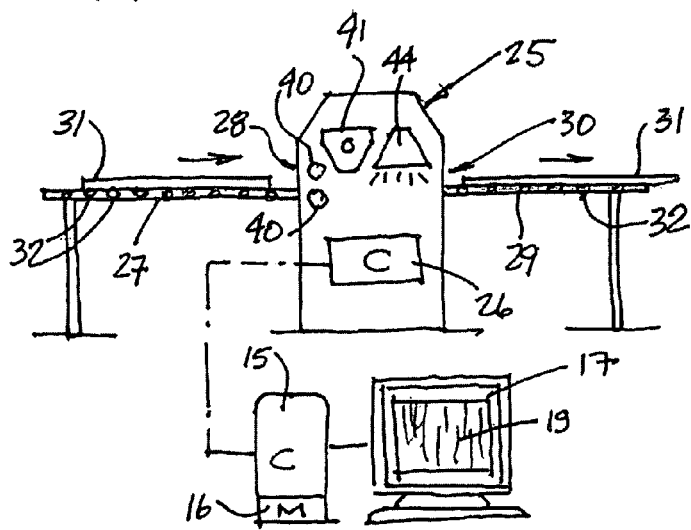
FIG. 6 is a schematic view showing the relationship between the computer and a colored ink printer machine adapted to print the image on slats to form a louvered blind.

The computer 15 is coupled to a color printer machine 25, as shown in FIG. 6. This color printer machine 25 has a computer 26 which is in communication with the computer 16 having stored therein the data to reproduce the computer software enhanced image 19. The colored ink printer machine 25, as shown in FIG. 6, is herein equipped to print the computer software enhanced image 19 on slats 35 to form louvered blinds.

With further reference to FIGS. 7 to 12, the system of printing on slats 35 will now be described. As shown in FIG. 6, the printer machine 25 is shown as having a support table 27 at a feed end 28 and a further support table 29 at an outlet end 30. A rigid flat support carrier sheet 31 is intended to be supported on the tables 27 and 29 and fed through the printer machine 25. These tables are provided with rollers 32 for ease of displacement of the rigid flat support carrier sheets. One of these carrier sheets 31 is illustrated in FIG. 9 and as hereinshown the sheet has a dimension greater than the 4'×8' image 23 and is provided on an upper support surface 33 thereof with spacer elements 34. These spacer elements 34 may be provided as elongated parallel metal strips rigidly secured to the support carrier sheet 31. The carrier sheet 31 and the spacers 34 are preferably, but not exclusively, constructed of aluminum or any suitable rigid material. The spacers 34 may also be provided in the form of small lugs 34' which are spaced-apart in transverse and longitudinal alignment, as shown in FIG. 9. The space between the spacer elements 34, 34' defines slat retention spaces 33' and are dimensioned whereby to receive in close fit therein slats 35, as illustrated in FIG. 8 which slats are used to form louvered blinds. As shown in FIG. 8, the spacer elements 34 have a thickness which is smaller than the thickness of the slats 36 whereby to expose an uppermost portion 37' of the elongated side edges of the slats 36. As hereinshown one of the opposed surfaces 38 of the slat is also exposed while the opposed surface 38' lies flat onto the upper surface 33 of the rigid carrier sheet 31. The slats are retained in the slat retention spaces 33' by retention means which as shown in FIG. 10 is constituted by a pressure release adhesive 65. Alternatively, the slats can be retained by vacuum and for this purpose vacuum ports or holes 66 may be provided in the upper support surface 33 of the slat retention spaces 33' of the carrier sheet 31, as illustrated in FIG. 9, and connect to a vacuum manifold, not shown but obvious to a person skilled in the art, under the sheet.

Figure 11:
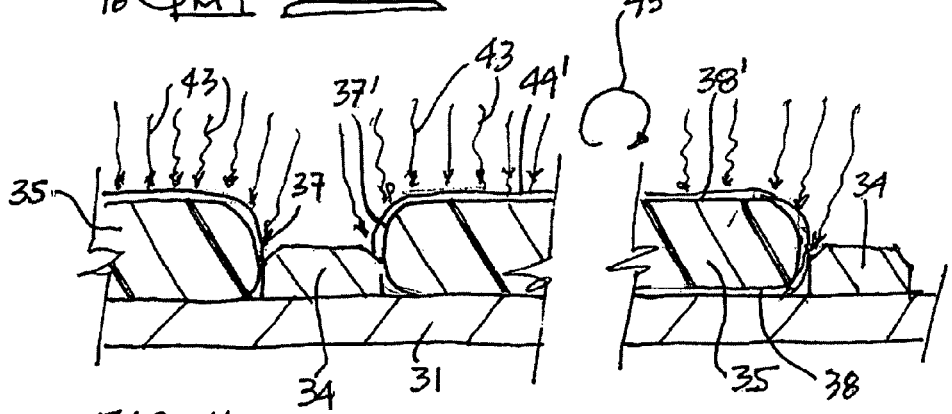
FIG. 11 is an enlarged fragmented cross-sectional view showing the ink being deposited on the surface of the slats.

With such an arrangement of slats over the entire surface of the carrier sheet 31, the carrier sheet is then conveyed through the printer machine 25 by suitable drive means of the machine, such as drive rolls 40, as illustrated in FIG. 6. The carrier sheet 31 is conveyed under a printer head 41 of the printer machine 25 which deposits a waterbase ink 44' onto the carrier board to print or paint the exposed surfaces. As shown in FIG. 11 the ink spray 43 is deposited on the top surface 38 of the louvers 36 as well as onto the uppermost exposed portions 37' of the side edges 37. It is pointed out that the printer machine 25 is one known in the art and the details of the printer head is not shown herein. The ink spray illustration 43 is simply to show that ink is deposited on the exposed edge surfaces 37 and 37' as well as on the top flat surface of the slats.

As the sheet passes under the printer head 41 it then is conveyed under ultraviolet drying lamp assemblies 44 which are UV lamps whereby to quickly dry the waterbased ink 44' deposited on the slats 36. The louvers thus exit the printer having been dried. These louvers are then turned upside down, as indicated by the arrow 45 in FIG. 11, into their respective retention spaces 33' whereby to print the other surface 38' as well as the other side edge portion, and such is illustrated in the right-hand side portion of FIG. 11. It is also pointed out that these slats 35, after they have been printed, are coated with a clear protective lacquer to hide imperfections and to also protect the image printed surface.

Figure 12:
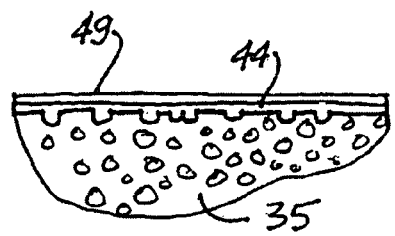
FIG. 12 is an enlarged fragmented section view showing the ink adhered to the surface of the slat and a clear protective coating having been applied over the ink printed image.

In order to provide for good adherence of the ink 44' onto the surface of the slats 36, these slats are extruded from a plastics material which is formulated to exhibit a micro porous outer surface 50 as illustrated in FIG. 7. Accordingly, the outer surface 50 is provided with a multitude of cavities or pores whereby the waterbased ink 44' will flow into the micro pores. FIG. 12 is a cross-section view showing the coating of the micro-pore surface. The clear protective coating 49 is shown applied over the ink coating 44'.

Although in FIG. 11 the spacers are shown to space the slats by a large gap, in reality this gap is much smaller but is sufficient to permit the ink to be deposited on the upper portion 37' of the side edges 37 of the slats 36 whereby the software enhanced computer-generated image 19 can overflow to adjacent slats secured in a louvered blind, as shown in FIG. 12 where three adjacent slats 36 are shown having a continuous image printed thereon. The computer is also programmed to take into account the spacer element whereby the image is continuous between opposed edged of the slats when assembled to form a lowered blind. As herein shown a knot 52 in the woodgrain pattern 12 is printed spanning two adjacent slats. Accordingly, when the slats 35 of the louvered blind are in a closed position, they display an undistorted, non-repeat, image simulating a real material.

Figure 14:
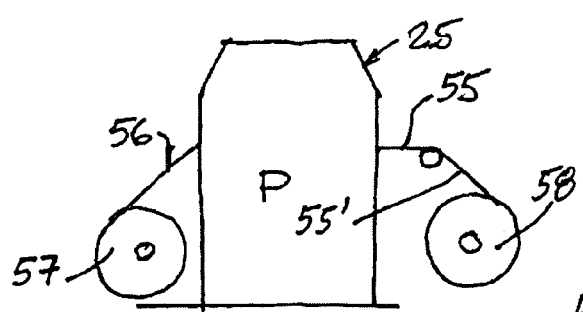
FIG. 14 is a simplified end view showing the colored ink printer machine adapted to print the computer-generated enhanced image on a fabric to be used for the construction of roller blinds.

FIG. 14 shows the colored ink printer machine 25 being adapted to print the computer software enhanced image 19 on a top surface 55 of a fabric material 56. The fabric material 56 is supplied in a roll form 57 and fed through the printer. A pick-up roll 58 re-rolls the fabric on which the computer software enhanced image 19 has been printed. That image can be printed several times along the length of the fabric and the fabric is then cut to form roller blinds.

Figure 15:
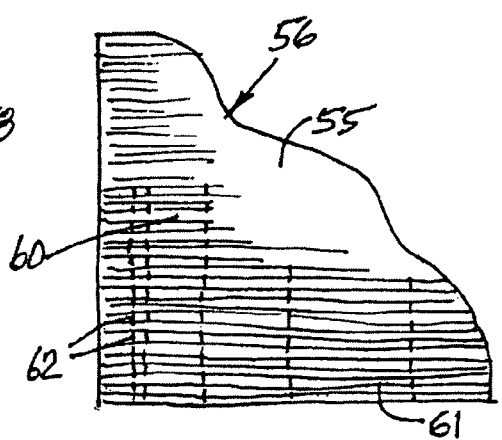
FIG. 15 is a fragmented plan view of a fabric having printed thereon an image resembling a natural stitch grass or bamboo slat fabric.

FIG. 15 shows a computer software enhanced image 60 having been printed on the surface 55 of the fabric material 56. The image as hereinshown represents grass strands 61 having different colors and color shades which are illustrated as being attached in tight side-by-side parallel relationship by stitching 62. The computer software enhanced image 60 is printed on opposed sides of the fabric material 56 by inverting the rolls and feeding the fabric back into the printer with the back surface 55' now being exposed for printing.

It is within the ambit of the present invention to cover any obvious modifications of the preferred embodiment described herein. Although the natural material samples hereinshown illustrate only two different products, it is to be understood that these products can be any natural material product that is usually utilized to make window shades. It is also to be understood that the computer generated images can be assembled, manipulated and enhanced to provide computer software enhanced images having a multitude of effects and by using photo enhancing software the color, the tone and the pattern in the surface of the scanned material can also be modified. It is also pointed out that preferably, but not exclusively, the material to be printed on should have a white or light colored surface whereby the true colors and tones and shades of the computer software enhanced image can be reproduced to a close resemblance of the scanned material. The slats may also have a slight bowed cross-section.

We claim:

1. A method of producing a window shade with a natural material printed image coated on at least one of opposed surfaces thereof, said method comprising the steps of:
   i) reproducing, by the use of a computer, a computer-generated image of a natural material on a screen of a computer, said computer-generated image of said natural material having opposed straight parallel side edges and end edges,
   ii) duplicating a plurality of said computer-generated image;
   iii) assembling said plurality of said computer-generated images together in a predetermined arrangement, positioning said plurality of computer-generated images in side-by-side and end-to-end contact relationship to produce a composed image having an assembly of said plurality of computer generated images with each delineated straight lines representing said opposed parallel side edges and end edges, said composed image having opposed parallel contour edges;

iv) enhancing said plurality of computer-generated images of said arrangement to blend said computer-generated images into a composite software enhanced image resembling a large piece of said natural materials; and v) printing said composite software enhanced image by the use of a colored ink printing machine on material to form said window shade.

2. A method as claimed in claim 1 wherein prior to said step (i) there is provided the step of scanning on a scanner device one or more portions of said real natural material an storing said scanned portions in a memory of said computer.

3. A method as claimed in claim 1 wherein said step iv) comprises using photo-enhancing software to enhance said assembled computer-generated images by treating said assembly of computer-generated images to cause said straight lines representing said opposed parallel side edges and end edges to substantially disappear and causing said plurality of said computer-generated images to blend into one another resulting in said enhanced image resembling a large piece of said natural material.

4. A method as claimed in claim 3 wherein said computer-generated images each have a representation of texture and color shading, said step iv) further comprises overlapping at least some of said computer-generated images to modify said texture and/or color shading at said opposed parallel side edges and edges of said assembly of computer-generated images, and if necessary cropping a straight line contour of said assembly to produce said enhanced image resembling a large piece of said natural material delineated by opposed parallel contour edges.

5. A method as claimed in claim 1 wherein said step iii) of assembling further comprises inverting some of said computer-generated images in said assembly of a plurality of computer-generated images.

6. A method as claimed in claim 1 wherein said window shade is a roller blind having a rolled fabric sheet, said step v) comprising printing said composite software enhanced image on said fabric sheet.

7. A method as claimed in claim 6 wherein said composite software enhanced image is printed on opposed surfaces of said fabric sheet.

8. A method of producing a louvered blind having a plurality of assembled slats having a natural material printed image coated on at least one of opposed surfaces of said slats, said slats having elongated side edges and transverse straight end edges, said method comprising the steps of:

i) reproducing, by the use of a computer, a computer-generated image of a material on a screen of a computer;

ii) duplicating a plurality of said computer-generated images;

iii) assembling said plurality of said computer-generated images together in a predetermined arrangement;

iv) enhancing said plurality of computer-generated images of said arrangement to blend said computer-generated images into a composite software enhanced image resembling a large piece of said natural materials;

v) assembling on a rigid flat support carrier sheet a plurality of said slats in side-by-side spaced relationship with one of said opposed surfaces exposed and at least an uppermost portion of said elongated side edges exposed and positioning said slats between spacer elements and secured to said support carrier sheet and applying a retention means to a lower one of said opposed surfaces; and vi) conveying said support carrier sheet through said colored ink printing device to print said enhanced image resembling a large piece of said natural material over said exposed one of said opposed surfaces and said exposed uppermost portion of said elongated side edges.

9. A method of producing a louvered blind having a plurality of assembled slats having a natural material printed image coated on at least one of opposed surfaces of said slats, said slats having elongated side edges and transverse straight end edges, said method comprising the steps of:

i) reproducing, by the use of a computer, a computer-generated image of a material on a screen of a computer; duplicating a plurality of said computer-generated images;

iii) assembling said plurality of said computer-generated images together in a predetermined arrangement;

iv) enhancing said plurality of computer-generated images of said arrangement to blend said computer-generated images into a composite software enhanced image resembling a large piece of said natural materials;

v) assembling on a rigid flat support carrier sheet a plurality of said slats in side-by-side spaced relationship with one of said opposed surfaces exposed and at least an uppermost portion of said elongated side edges exposed;

vi) conveying said support carrier sheet through said colored ink printing device to print said enhanced image resembling a large piece of said natural material over said exposed one of said opposed surfaces and said exposed uppermost portion of said elongated side edges; and wherein after said slats have been printed on said opposed one of said opposed surfaces and said exposed uppermost portion of said elongated side edges there is further provided the step of vii) inverting said printed slats on said support carrier sheet; and viii) conveying said support carrier sheet through said printing device a second time to print said composite software enhanced image on the other of said opposed surfaces and the other exposed uppermost portion of said elongated side edges.

10. A method of producing a louvered blind having a plurality of assembled slats having a natural material printed image coated on at least one of opposed surfaces of said slats, said slats having elongated side edges and transverse straight end edges, said method comprising the steps of:

i) reproducing, by the use of a computer, a computer-generated image of a material on a screen of a computer;

ii) duplicating a plurality of said computer-generated images;

iii) assembling said plurality of said computer-generated images together in a predetermined arrangement;

iv) enhancing said plurality of computer-generated images of said arrangement to blend said computer-generated images into a composite software enhanced image resembling a large piece of said natural materials;

v) assembling on a rigid flat support carrier sheet a plurality of said slats in side-by-side spaced relationship with one of said opposed surfaces exposed and at least an uppermost portion of said elongated side edges exposed;

vi) conveying said support carrier sheet through said colored ink printing device to print said enhanced image resembling a large piece of said natural material over said exposed one of said opposed surfaces and said exposed uppermost portion of said elongated side edges, and vii) assembling and interconnecting said slats to form a louvered blind with said slats disposed in the same sideby-side relationship as on said support carrier board to reproduce said composite software enhanced image when said slats of said blind are in a closed position, said composite software enhanced image having patterns therein, said patterns being visible when said slats are in said closed position with said pattern overlapping between adjacent slats.

11. A system for the production of a window shade having a natural material image coated on at least one of opposed surfaces of said window shade, said system comprising a computer having a memory for storing data representative of a computer-generated image, a computer screen for displaying an assembly of a plurality of said computer-generated image wherein said images are assembled in end-to-end and side-by-side relationship, photo-enhancing software to interconnect said images to reproduce a composite software enhanced image resembling a large piece of said computer-generated image, a colored ink printer machine for printing said composite software enhanced image on material to form said window shade, and wherein said material is a plurality of slats to form louvered blinds; said slats being elongated rectangular slats each having opposed surfaces, elongated side edges and transverse straight end edges; said colored ink printer machine having a displaceable rigid flat support carrier sheet associated therewith, said support carrier sheet being adapted to support and retain a plurality of said slats in side-by-side spaced relationship with one of said opposed surfaces exposed and at least an uppermost portion of said elongated side edges exposed, said printer device having conveying means to displace said support carrier sheet under a displaceable printer head thereof, said support carrier sheet being provided with spacer elements secured to a slat support surface thereof in parallel spaced relationship, said spacer elements defining a slat retention space therebetween, said spacer elements having a thickness which is smaller than the thickness of said slats to permit said at least an uppermost portion of said elongated side edge to be exposed to receive ink thereon by said printer machine.

12. A system as claimed in claim 11 wherein said colored ink printer machine is further provided with ultra-violet lamps to quickly dry said ink deposited on said slats, said ink being a water-based ink.

13. A system as claimed in claim 11 wherein said slat retention space is provided with retention means to retain said slats therein.

14. A system as claimed in claim 13 wherein said slat retention means is one of a pressure release adhesive or vacuum ports.

* * * * *